(12) United States Patent
Abehasera

(10) Patent No.: US 11,382,351 B1
(45) Date of Patent: Jul. 12, 2022

(54) PRE-ROLL FILLING DEVICE WITH INTEGRATED SCALE

(71) Applicant: TRI Innovations, LLC, Hallandale Beach, FL (US)

(72) Inventor: Benyamin Abehasera, Hallandale Beach, FL (US)

(73) Assignee: TRI INNOVATIONS, LLC, Hallandale Beach, FL (US)

( * ) Notice: Subject to any disclaimer, the term of this patent is extended or adjusted under 35 U.S.C. 154(b) by 0 days.

(21) Appl. No.: 17/375,805

(22) Filed: Jul. 14, 2021

(51) Int. Cl.
| | |
|---|---|
| *A24C 5/02* | (2006.01) |
| *A24C 5/39* | (2006.01) |
| *A24C 5/34* | (2006.01) |
| *A24F 19/00* | (2006.01) |
| *A24F 19/10* | (2006.01) |
| *F23Q 7/16* | (2006.01) |
| *G01G 23/18* | (2006.01) |

(52) U.S. Cl.
CPC ............. *A24C 5/3424* (2013.01); *A24C 5/02* (2013.01); *A24C 5/392* (2013.01); *A24C 5/395* (2013.01); *A24F 19/0035* (2013.01); *A24F 19/10* (2013.01); *F23Q 7/16* (2013.01); *G01G 23/18* (2013.01)

(58) Field of Classification Search
CPC ................................. A24C 5/3424; A24C 5/02
See application file for complete search history.

(56) References Cited

U.S. PATENT DOCUMENTS

| | | | | |
|---|---|---|---|---|
| 9,895,698 | B2* | 2/2018 | Spielman | B02C 18/144 |
| 2017/0245541 | A1* | 8/2017 | Pagan | A47J 42/12 |
| 2020/0329756 | A1* | 10/2020 | Karim | A24C 5/44 |
| 2020/0345061 | A1* | 11/2020 | Veelo | A24B 7/06 |
| 2020/0367549 | A1* | 11/2020 | Kamer | A24C 5/002 |
| 2021/0024233 | A1* | 1/2021 | Giddings | B65B 1/12 |
| 2021/0030054 | A1* | 2/2021 | Godwin | A24C 5/02 |

\* cited by examiner

*Primary Examiner* — Cynthia Szewczyk
(74) *Attorney, Agent, or Firm* — Geoffrey Lottenberg; Berger Singerman LLP

(57) ABSTRACT

A filling device has a base that retains a sleeve in which a pre-roll cone is placed. A scale is located below the sleeve to weigh the contents of the pre-roll cone as it is filled. A filling hopper is placed above the sleeve to introduce ingredients, such as smoking material, into the pre-roll cone. An integrated automatic lighter is included in the base and is triggered by a physical switch or by a motion and/or proximity sensor. An electronics-enabled cover includes an air pump, fan, UV-C sanitizing light, and other features to add in the filling process and in sanitation. An ashtray accessory with an odor or flavor additive and a fan may also be provided. The functions of the filling device can be controlled by external devices, like a smartphone, through a software application.

18 Claims, 5 Drawing Sheets

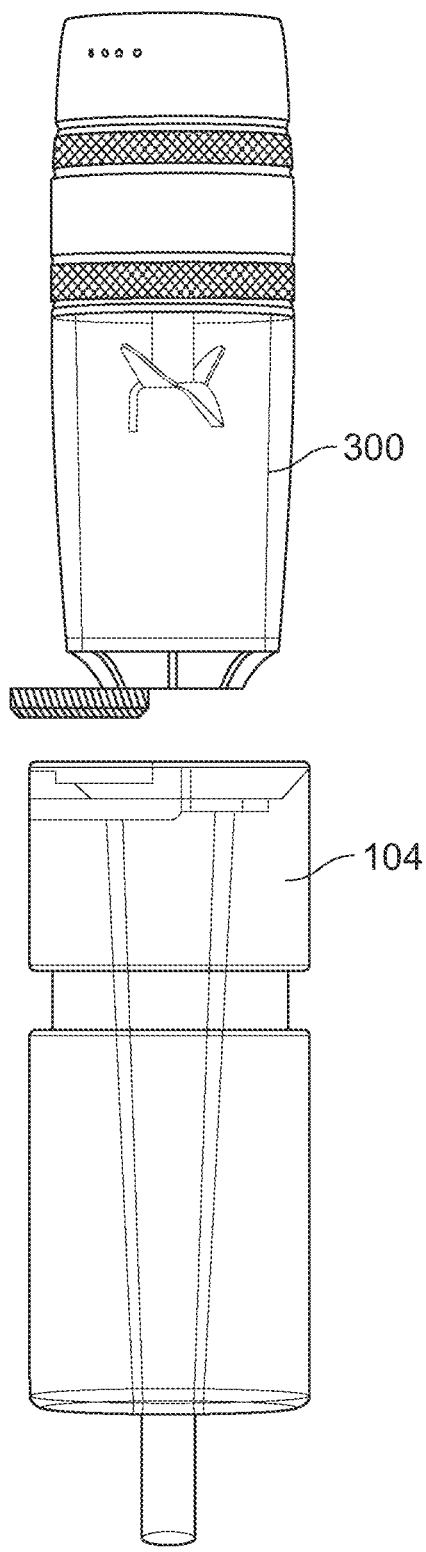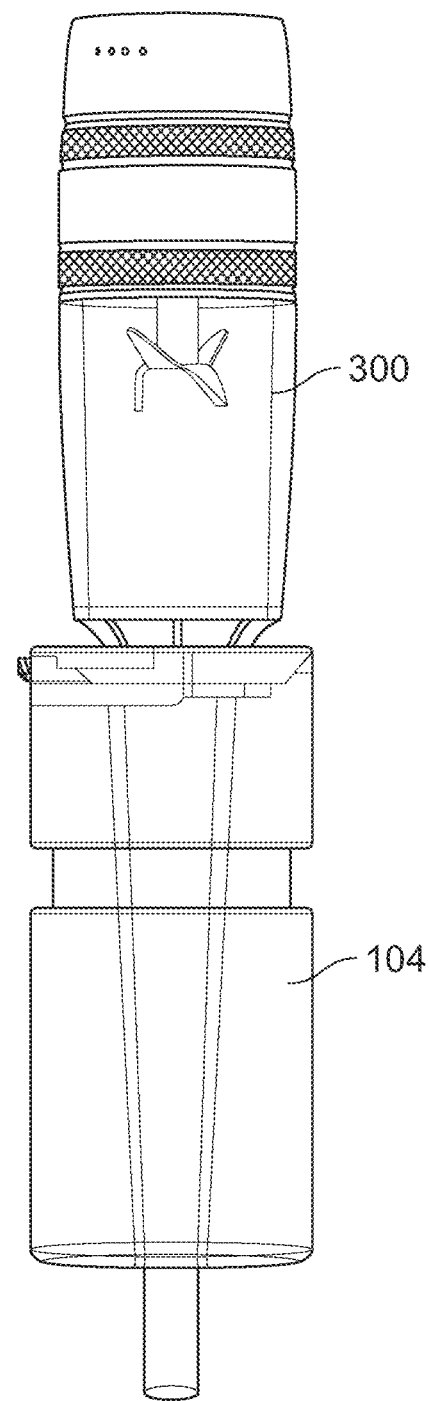
FIG. 2A
FIG. 2B

PRE-ROLL FILLING DEVICE WITH INTEGRATED SCALE

CROSS REFERENCE TO RELATED APPLICATIONS

N/A.

FIELD OF THE INVENTION

The present invention relates to the technical field of cigar and cigarette pre-roll filling devices, more particularly to a computer-connectable pre-roll filling device with an integrated scale.

BRIEF DESCRIPTION OF THE DRAWINGS

FIG. 2A shows a grinder adjacent to the sleeve.
FIG. 2B shows the grinder attached to the sleeve.

DETAILED DESCRIPTION

In the following description, for the purposes of explanation, numerous specific details are set forth in order to provide a thorough understanding of the present invention. It will be apparent, however, to one skilled in the art that the present invention may be practiced without some of these specific details. Throughout this description, the embodiments and examples shown should be considered as exemplars, rather than as limitations on the invention. That is, the following description provides examples, and the accompanying drawings show various examples for the purposes of illustration. However, these examples should not be construed in a limiting sense as they are merely intended to provide examples of the invention rather than to provide an exhaustive list of all possible implementations thereof.

Specific embodiments of the invention will now be further described by the following, non-limiting examples which will serve to illustrate various features. The examples are intended merely to facilitate an understanding of ways in which the invention may be practiced and to further enable those of skill in the art to practice the invention. Accordingly, the examples should not be construed as limiting the scope of the invention. In addition, reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" or "in some embodiments" in various places throughout this specification are not necessarily all referring to the same embodiment. Furthermore, the particular features, structures or characteristics may be combined in any suitable manner in one or more embodiments.

Figure 1:
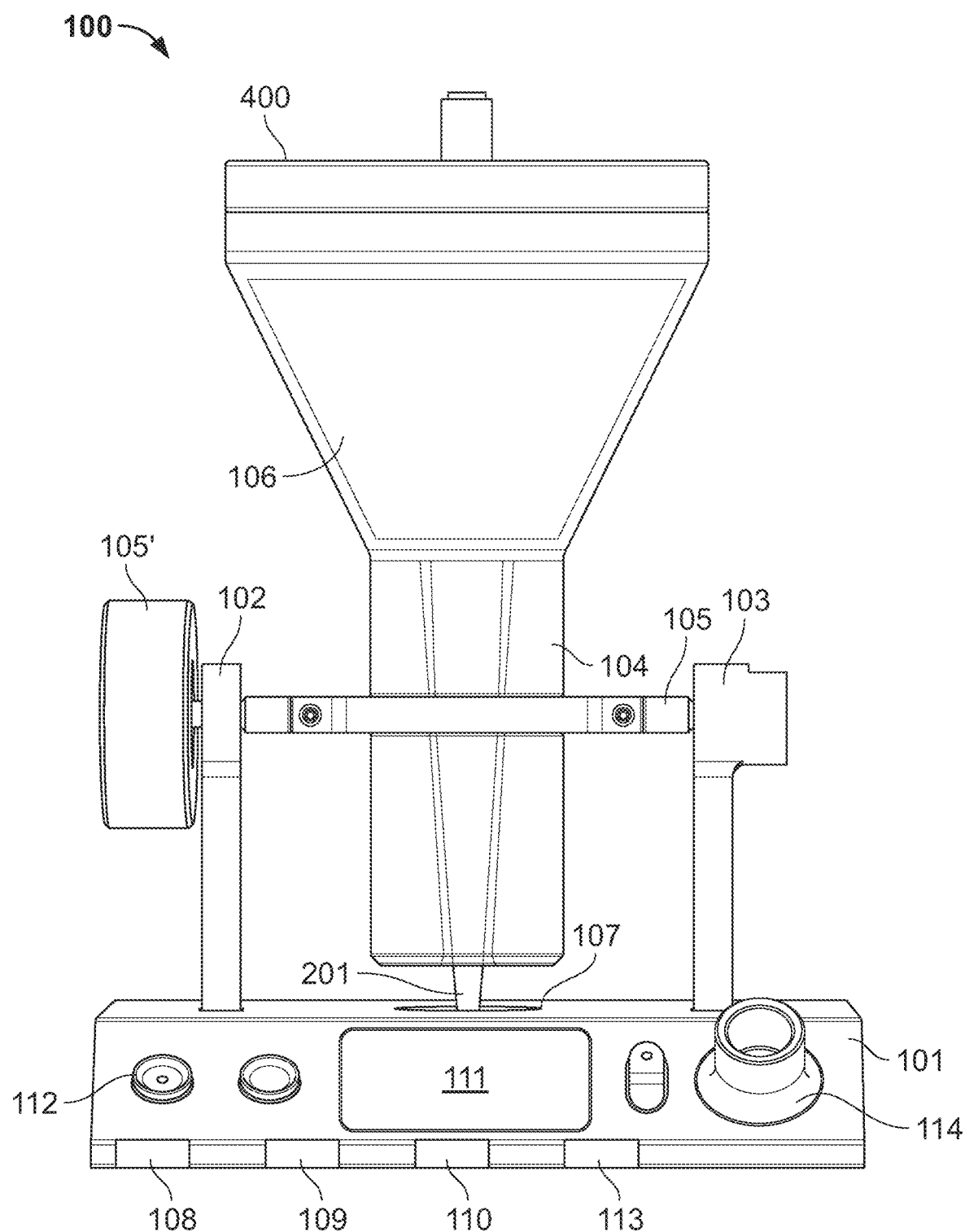
FIG. 1 is a schematic of the pre-roll filling device.
Figure 2C:
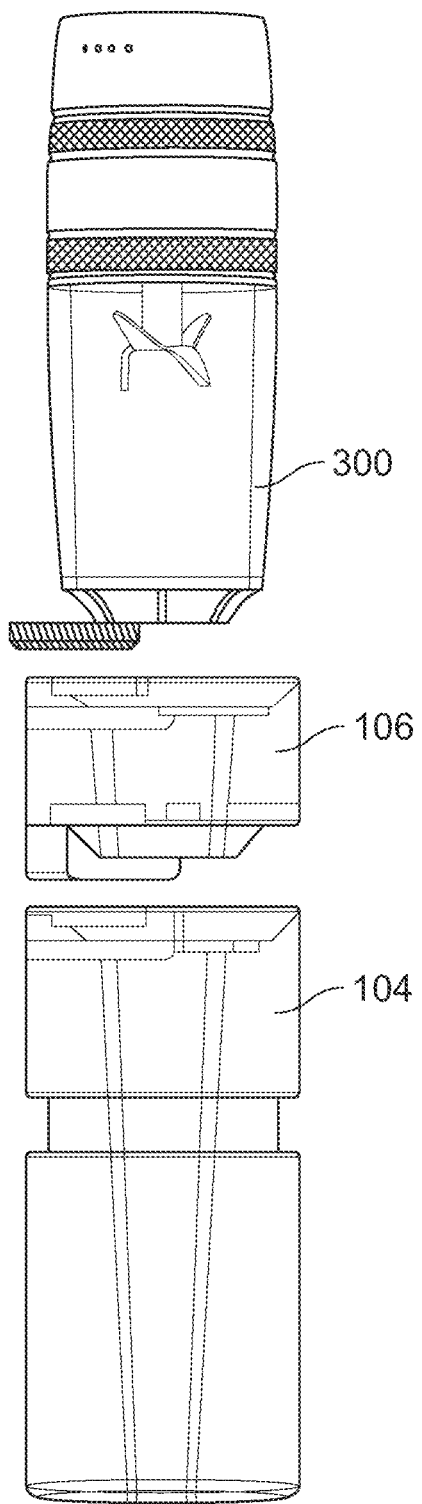
FIG. 2C shows a grinder adjacent to an adapter which is adjacent to the sleeve.
Figure 2D:
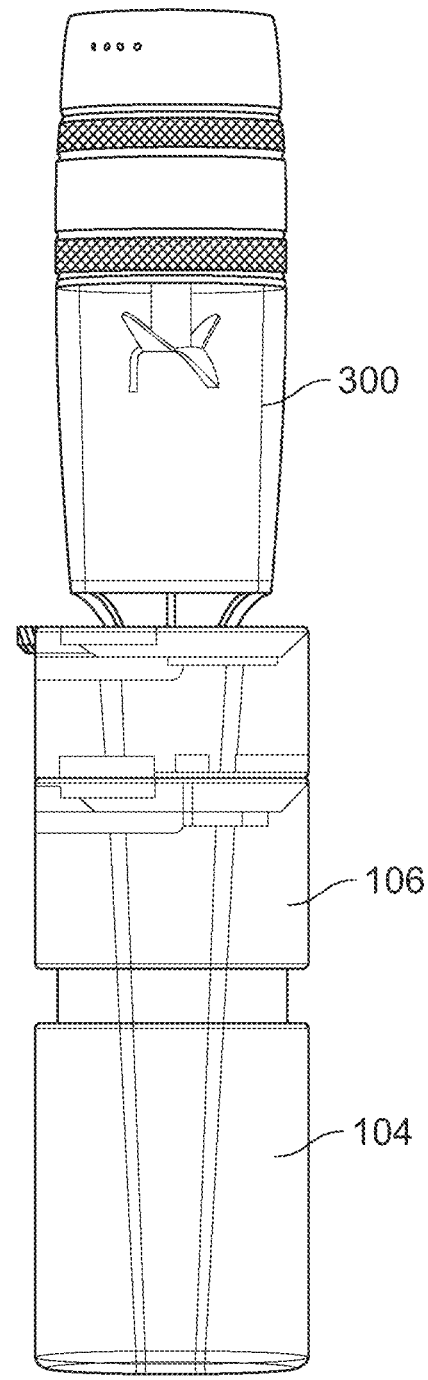
FIG. 2D shows the grinder attached to the adapter which is attached to the sleeve.

Referring to FIG. 1, the pre-roll filling device 100 includes a base 101 with bilateral stanchions 102 and 103. Suspended between the stanchions 102 and 103 is a sleeve 104 which, in some embodiments is generally conical in shape and has an open top and an open bottom. In some embodiments, the sleeve 104 is mounted to a pivot pin 105 which rests on or is attached to the top of the stanchions 102 and 103. In some embodiments, the pin 105 facilitates rotation or swinging of the sleeve 104 to allow the sleeve 104 to be repositioned and/or agitated manually as further described herein. In some embodiments, an end of the pin 105 includes a wheel 105' to facilitate manual rotation of the pin 105, and therefore the sleeve 104. Above the sleeve 104 is a hopper 106 which in some embodiments comprises a funnel-shaped element or may comprise a cup or other container. With reference to FIGS. 2A-2D, in some embodiments, the hopper 106 is configured as an extender-adapter to receive a larger pre-roll cone as further described herein. In some embodiments, the top of the sleeve 104 and/or the hopper 106 is threaded or has other attachment components, such as magnetic connections, to removably receive and retain corresponding threads or attachment components on the thereon and/or to removably receive and retain other devices such as the discharge section of a grinder 300 or container such as that described in Applicant's U.S. patent application Ser. Nos. 16/285,582, 16/285,609, 16/285,628, 16/285,651, 16/285,678, which applications are hereby incorporated by reference in their entirety. This functionality is shown in detail in FIGS. 2A-2D.

In some embodiments, an electronic scale 107 is disposed beneath the sleeve 104 and used to weigh the contents of the pre-roll during the filling process as further described herein. The scale 107 is incorporated into the base 101, which base 101 houses certain electronic components of the device 100, including a power source 108, such as a battery or external power supply (for example, a USB-C charger), a microcontroller 109, a communications device 110, a display 111, one or more buttons 112, and a sensor array 113.

Figure 3:
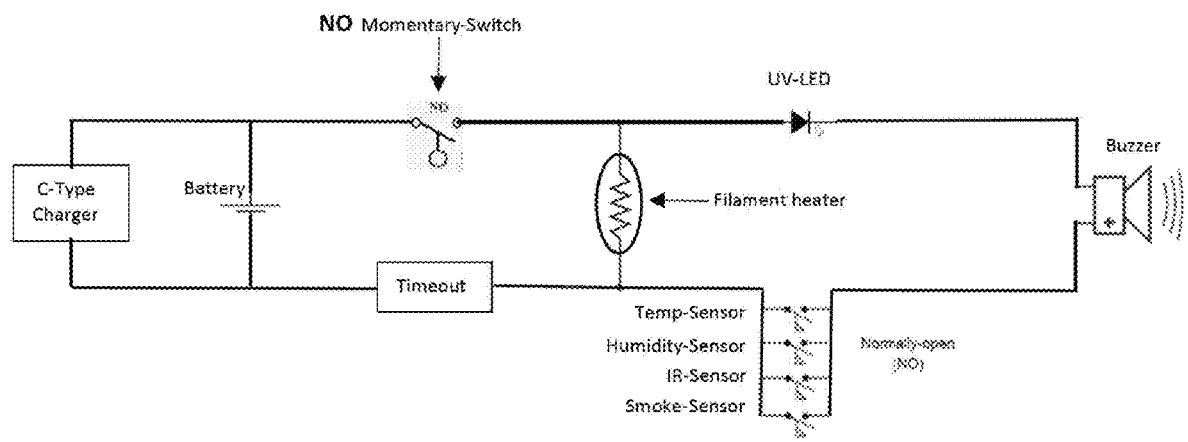
FIG. 3 is a circuit diagram for the lighter.
Figure 4:
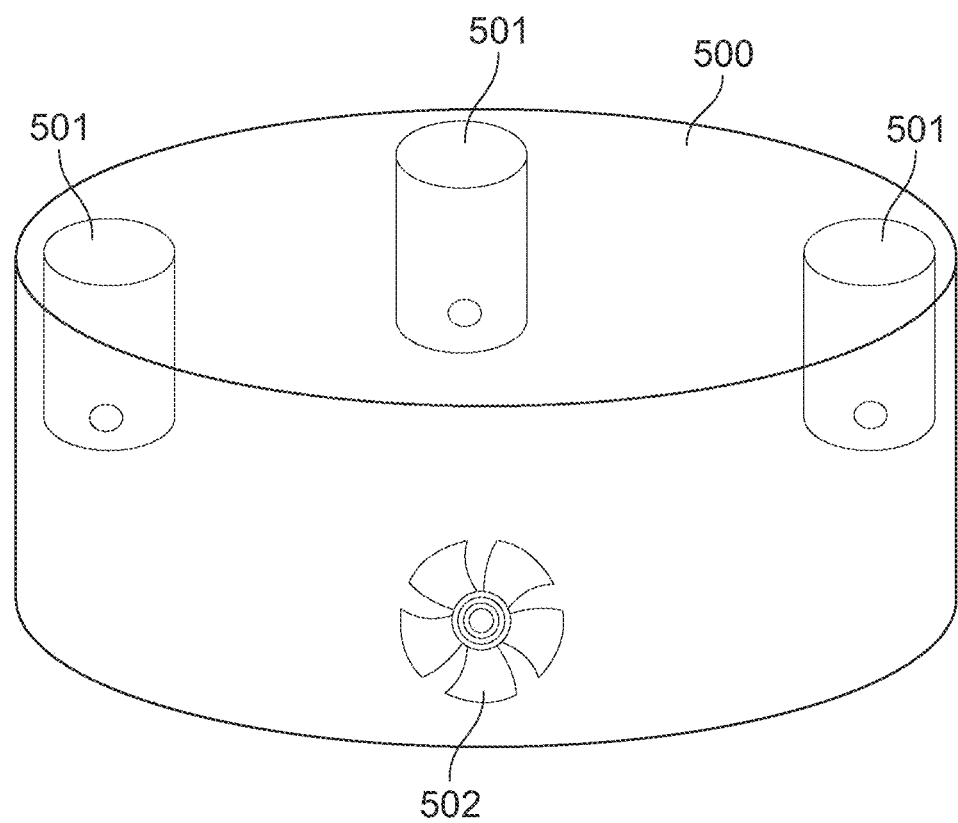
FIG. 4 is a schematic of the accessory unit.

Also included is a lighter 114, which can comprise a heating element which is triggered by a motion or proximity sensor or by a physical button inside the cavity of the lighter. This allows the lighter to activate when it senses the insertion of a pre-roll cone, cigarette or like smoking implement. In some embodiments, the heating element is triggered by a momentary, closed circuit switch. The lighter 114 may also include a circuit, shown in FIG. 3, which includes a UV-LED, a temperature sensor, a humidity sensor, an infrared volume sensor, and a smoke detection sensor.

The microcontroller 109 provides power and communication connectivity for the various system components including the communications device 110, display 111, and sensor array 113. In some embodiments the microcontroller 109 comprises a processor (CPU), memory, and control programming for the various input and output peripherals. The communications device 110 may comprise a modem, Wifi chip, a Bluetooth chip, a NFC chip, a Universal Serial Bus (USB) port, or combinations thereof. In some embodiments the communication device 110 is configured to communicate with an external computing device such as a computer or smartphone in order to send and receive data including status information, scale information, and commands. Such data transmission can be accomplished through a customized application running on the smartphone or computer.

The display 111 may comprise an LED, LCD, OLED, or like display that can be used to output various information including contents weight, battery status, communications status, and the like. The buttons 112 are used as onboard control interface and may be multi-function and programmed to operate different functions based on the number and duration of presses. In some embodiments one or more of the buttons 112 is a multi-touch touch screen for added functionality.

In some embodiments, the sensor array 113 functions as a scale transducer to measure the mechanical energy, i.e. the pressure applied to the scale 107 by the contents placed thereon, and converts the pressure to an electrical output (e.g. current or voltage differential). The electrical output at the sensor is processed into a digital signal by the microcontroller 109 which digital signal can then be outputted on display 111 or through the communications device 110.

In some embodiments, an electronics-enabled cover 400 is provided, which is removably received over the hopper. The cover 400 can also include a microcontroller, one or more indicator lights (such as LEDs), a sanitizing UVC light, an infrared volume sensor, a fan or air pump, a vibration unit, a power source (for example, a battery and/or external power source such as a USB-C charger), and one or more buttons. These features allow for manipulation of the contents of the hopper 106, such as by applying air flow or vibration to agitate ingredients to facilitate filling or to provide air flow to the surrounding environment. The UVC light may be used to sanitize the ingredients in the hopper 106 and/or sleeve 104 prior to filling, or to otherwise sanitize the surfaces of the components of the device 100.

In use, the user places a pre-roll cone (cigarette paper) 201 into the sleeve 104 and then fills the pre-roll cone 201 with ingredients (tobacco, *cannabis*, herbs, cloves, medicaments, etc.) from the hopper 106. The ingredients displace downward into the pre-roll cone 201 which is supported by the sleeve 104. In some embodiments, the scale 107 is employed to weigh the contents of the pre-roll cone 201 and when the desired weight is reached, the now-filled pre-roll cone 201 is removed from the sleeve 104 and set aside. In that way, the end of the pre-roll cone 201 rests against the scale 107 in order for the contents to be weight. Accordingly, as shown in FIG. 1, in some embodiments, an end of the pre-roll cone (where 201 points) extends beyond the open bottom of the sleeve 104. The cover 400 can be employed to facilitate filling through airflow or vibration.

Optionally, a removable ashtray accessory 500 may be employed may be a standalone device or which may be disposed inside or adjacent to the device 100 and may be attachable to the thereto, for example, by magnets or the like that attach to the base 101 or other component thereof. In some embodiments, the ashtray accessory 500 includes one or more receptacles 501 which can be used to store a cigarette or cigar. In some embodiments the ashtray accessory 500 includes an additive such as a desiccant, odor eliminator, air freshener, flavorant (i.e. flavoring agent), or colorant. In some embodiments, the additive is a liquid or gel ingredient that can emit flavorants and/or colorants that can change or enhance the flavor, odor, and/or color of the material filled into the pre-roll cone 201. In some embodiments, the ashtray accessory 500 may include a small battery-powered fan 502 to ventilate the ashtray and/or circulate the additive.

As noted above, the container includes connectivity features such that the communications device 110 can communicate with an outboard smartphone or computer for added functionality. In some embodiments the device is "app-enabled" and works in conjunction with control and notification software. The user can utilize an application running on a smartphone or computer to obtain information from the container such as weight, battery status, or the like. In some embodiments, the scale 107 obtains a weight measurement and stores corresponding weight data in the memory of the microcontroller 109. Then, each time of the user loads the application on his computing device, the stored weight information is automatically synchronized to the application.

It is appreciated and understood that the present invention provides an easy to use, feature-rich filling device for the filling and management of herb such as tobacco, hemp, Chinese herbal medicine, spices etc. for smoking or other uses. Convenience features such as the integrated scale, display, onboard communications, and various storage areas provide an "all-in-one" solution that addresses many wants and desires in the art.

It is to be noticed that the term "comprising," used in the claims, should not be interpreted as being limitative to the means listed thereafter. Thus, the scope of the expression "a device comprising means A and B" should not be limited to devices consisting only of components A and B. It means that with respect to the present invention, the only relevant components of the device are A and B. Put differently, the terms "including", "comprising" and variations thereof mean "including but not limited to", unless expressly specified otherwise.

Similarly, it is to be noticed that the term "coupled", also used in the claims, should not be interpreted as being limitative to direct connections only. Thus, the scope of the expression "a device A coupled to a device B" should not be limited to devices or systems wherein an output of device A is directly connected to an input of device B. It means that there exists a path between an output of A and an input of B which may be a path including other devices or means.

The enumerated listing of items does not imply that any or all of the items are mutually exclusive, unless expressly specified otherwise. The terms "a", "an" and "the" mean "one or more", unless expressly specified otherwise.

Elements of the invention that are in communication with each other need not be in continuous communication with each other, unless expressly specified otherwise. In addition, elements of the invention that are in communication with each other may communicate directly or indirectly through one or more other elements or other intermediaries.

One skilled in the art will appreciate that the present invention can be practiced by other than the above-described embodiments, which are presented in this description for purposes of illustration and not of limitation. The specification and drawings are not intended to limit the exclusionary scope of this patent document. It is noted that various equivalents for the particular embodiments discussed in this description may practice the invention as well. That is, while the present invention has been described in conjunction with specific embodiments, it is evident that any alternatives, modifications, permutations and variations will become apparent to those of ordinary skill in the art in light of the foregoing description. Accordingly, it is intended that the present invention embrace all such alternatives, modifications and variations as fall within the scope of the appended claims. The fact that a product, process or method exhibits differences from one or more of the above-described exemplary embodiments does not mean that the product or process is outside the scope (literal scope and/or other legally-recognized scope) of the following claims.

What is claimed is:

1. A filling device for a pre-roll cone, comprising:
   a sleeve mounted to a base by a pivot pin, the sleeve having an open top and an open bottom;
   wherein the sleeve is configured to removably receive the pre-roll cone; and
   a scale disposed beneath the sleeve for weighing the contents of the pre-roll cone.

2. The filling device of claim 1, including a hopper attachable to the top of the sleeve.

3. The filling device of claim 1, including an air pump providing air flow at the top of the device to facilitate filling of the pre-roll cone.

4. The filling device of claim 1, wherein the scale includes a display and a microcontroller.

5. The filling device of claim 4, wherein the scale includes one or more buttons in electrical communication with the microcontroller.

6. The filling device of claim 4, wherein the scale includes a communications device comprising a modem, Wifi chip, a Bluetooth short range wireless radio chip, a NFC chip, a Universal Serial Bus (USB) port, or combinations thereof.

7. The filling device of claim 6, wherein the communication device is configured to communicate with an external computing device such as a computer or smartphone in order to send and receive data including status information, scale information, and commands.

8. The filling device of claim 1, wherein the open top of the pre-roll cone is configured to receive a dispensing section of a grinder.

9. The filling device of claim 1, wherein the open top of the pre-roll cone is configured to receive an extender-adapter to increase the size of the sleeve.

10. The filling device of claim 9, wherein an open top of the extender-adapter is configured to receive a dispensing section of grinder.

11. The filling device of claim 1, wherein the sleeve is configured such that an end the pre-roll cone extends beyond the open bottom of thereof such that the end of the pre-roll cone rests on the scale.

12. A filling device for a pre-roll cone, comprising:
a sleeve pivotably mounted to a base, the sleeve having an open top and an open bottom;
wherein the sleeve is configured to removably receive the pre-roll cones;
a scale disposed beneath the sleeve for weighing the contents of the pre-roll cone; and
an electronics-enabled cover including an air pump providing air flow at the top of the device to facilitate filling of the pre-roll cone.

13. The filling device of claim 12, wherein the cover includes a UVC sanitizing light.

14. A filling device for a pre-roll cone, comprising:
a sleeve pivotably mounted to a base, the sleeve having an open top and an open bottom;
wherein the sleeve is configured to removably receive the pre-roll cones;
a scale disposed beneath the sleeve for weighing the contents of the pre-roll cone; and
an automatically triggerable lighter comprising a heating element and one of a motion sensor, proximity sensor, or momentary switch.

15. The filling device of claim 14, wherein the lighter comprises a temperature sensor, a humidity sensor, an infrared sensor, a smoke detection sensor, or combinations thereof.

16. The filling device of claim 14, including an ashtray accessory including one or more receptacles configured to store a smoking implement.

17. The filling device of claim 16, wherein the ashtray accessory includes a fan.

18. The filling device of claim 16, wherein the ashtray accessory includes an additive comprising a desiccant, odor eliminator, flavorant, colorant, or combinations thereof.

* * * * *